United States Patent
Yoshida et al.

[11] Patent Number: 5,873,630
[45] Date of Patent: Feb. 23, 1999

[54] ROTARY-CAM TYPE RECLINING DEVICE

[75] Inventors: Tomonori Yoshida, Yokohama; Moriyuki Eguchi, Ebina, both of Japan

[73] Assignee: Ikeda Bussan Co., Ltd., Ayase, Japan

[21] Appl. No.: 746,344

[22] Filed: Nov. 8, 1996

[30] Foreign Application Priority Data

Nov. 8, 1995 [JP] Japan ................................ 7-314703

[51] Int. Cl.⁶ .................................................. B60N 2/22
[52] U.S. Cl. ...................................... 297/367; 297/216.13
[58] Field of Search ......................... 297/216.13, 216.14, 297/367, 378.12

[56] References Cited

U.S. PATENT DOCUMENTS

| | | | |
|---|---|---|---|
| 4,789,205 | 12/1988 | Pipon et al. | 297/367 |
| 5,161,856 | 11/1992 | Nishino | 297/367 |
| 5,507,553 | 4/1996 | Nishizawa et al. | 297/216.13 |
| 5,590,931 | 1/1997 | Fourrey et al. | 297/367 X |

FOREIGN PATENT DOCUMENTS 6-125821  5/1994  Japan .
1046893  10/1966  United Kingdom ................ 297/367

*Primary Examiner*—Peter R. Brown
*Attorney, Agent, or Firm*—Foley & Lardner

[57] ABSTRACT

A rotary-cam type reclining device comprises a base fixedly connected to a seat cushion, a toothed arm fixedly connected to a seat back and rotatably supported on the base via a pivot, a toothed block slidably disposed between the base and the arm and having an outer toothed portion and a cam-contour surface and slidably guided by two parallel side walls of a recessed toothed-block guide defined in the base, a rotary cam for producing outward and inward sliding motions of the toothed block to mesh and unmesh the outer toothed portion of the toothed block with and from the inner toothed portion of the arm by a rotary motion of the cam, and an operating lever mechanically linked to the cam for producing the rotary motion of the cam. Also provided between the arm and the toothed block is an auxiliary interlocking member, which is responsive to a deformation of the toothed block resulting from impact force applied to the arm for interlocking the device.

4 Claims, 5 Drawing Sheets

ROTARY-CAM TYPE RECLINING DEVICE

BACKGROUND OF THE INVENTION

1. Field of the Invention

The present invention relates to a rotary-cam type reclining device suitable for use in automobile reclining seats, and more specifically to a rotary-cam type seat reclining device lockable by way of a rotary motion of the rotary cam mechanically linked to a reclining lever to ensure forward-and-backward angular adjustment of a seat back relative to a seat cushion.

2. Description of the Prior Art

In recent years, there have been proposed and developed various rotary-cam type reclining devices. A typical rotary-cam type reclining device includes a base fixedly connected to a seat cushion and having a recessed portion formed with two opposing parallel side walls, an arm fixedly connected to a seat back and rotatably supported by the base via a pivot shaft, two or more toothed blocks each slidably guided in the two opposing parallel side walls in the base, a reclining lever integrally connected to the pivot shaft, and a rotary cam usually fixedly connected to the pivot shaft of the reclining lever and acting to mesh or unmesh the toothed blocks with or from the inner toothed portion of the arm by way of rotation of the rotary cam. One such conventional rotary-cam type reclining device has been disclosed in Japanese Patent First Publication No. 6-125821 (corresponding to French Patent Application No. 91 02590 filed on Mar. 5, 1991). A conventional rotary-cam type reclining device disclosed in the Japanese Patent First Publication No. 6-125821 includes a stationary flange portion, often called a base, fixedly connected to a seat cushion, a rotatable flange portion, often called an arm, fixedly connected to a seat back, and a rotary cam. The rotatable flange portion is formed with an inner toothed portion on its inner periphery. On the other hand, the stationary flange portion is formed with a plurality of cup-like recessed portions, each radially guiding and slidably accommodating therein a toothed block. A plurality of block pushers are interposed between the rotary cam and the respective toothed blocks. Each of the toothed blocks can be meshed with or unmeshed from the inner toothed portion of the arm via radially outward sliding motion of each of the block pushers being in cam-connection with the rotary cam. One rotational movement of the rotary cam, equivalent to a pull-up motion of the reclining lever, produces a radially inward sliding movement of each block pusher and the inner toothed portion of the arm is unmeshed from the outer toothed portions of the toothed blocks, thus allowing an angular adjustment of the rotatable flange portion relative to the stationary flange portion. If the rotary cam is rotated in the other rotational direction together with the reclining lever with the seat back set at a desired angular position determined by the vehicle occupant, the outer toothed portions of the toothed blocks are brought again into meshed-engagement with the inner toothed portion of the rotatable flange portion by virtue of a radially outward sliding motion of each block pusher, resulting from the other rotational movement of the cam. Assuming that an excessively large external force such as impact force is applied to the rotatable flange portion connected to the seat back under such a fully-locked condition of the device where the toothed blocks are meshed with the rotatable flange portion, the rotatable arm is heavily loaded in a certain rotational direction and as a result a relatively large bending moment and a shearing force are produced in the toothed blocks which may be subjected to an excessively large load, transmitted from the rotatable flange portion via the plural meshing pairs to the toothed blocks. In case of application of excessively large impact force, each of the toothed blocks could be brought into collision-contact with the associated side walls of the cup-like recessed portions, with the result that a bearing pressure or bearing stress, acting on the side walls of the cup-like recessed toothed-block guiding portion, may be abruptly risen or there may be result in stress concentration on the side walls. This results in undesired deformation of the side walls of the cup-like recessed portion of the stationary flange portion. As is generally know, it is important to lighten the entire weight of the device, while insuring a required mechanical strength of the device. Additionally, to insure a smooth sliding motion of each toothed block within the cup-like recessed guide portion, there is less friction between the side wall of the recessed guide portion and the side wall of the toothed block, in sliding-contact and there is less play between the two opposing side walls. To avoid undesired deformation of each toothed block and a rotary cam in case of application of an excessively large load, it is necessary to properly increase the thickness in each side wall of the recessed guide portion and/or a thickness in each toothed block, to increase the mechanical strength of the reclining device. Alternatively, to enhance the mechanical strength, a material having a high mechanical strength, such as a high-strength steel, can be used. To lighten the device and reduce the production costs, the previously-noted two methods for the mechanical-strength enhancement is unpreferable.

SUMMARY OF THE INVENTION

Accordingly, it is an object of the invention to provide an improved rotary-cam type reclining device that avoids the foregoing disadvantages of the prior art.

It is another object of the invention to provide a rotary-cam type reclining device employing a base (fixedly connected to a seat cushion) and an arm (fixedly connected to a seat back). The device according to the invention has a high mechanical strength without changing the thickness of each side wall of a recessed toothed-block guide of the base and a thickness of a radially slidable toothed block meshable with an inner toothed portion of the arm, in comparison with a prior-art rotary-cam type reclining device.

In order to accomplish the aforementioned and other objects of the invention, a rotary-cam type reclining device comprises a base fixedly connected to a seat cushion, and defining therein a recessed toothed-block guide, said recessed toothed-block guide having a pair of parallel side walls, an arm fixedly connected to a seat back and rotatably supported on said base, said arm having an inner toothed portion, a toothed block slidably disposed between said base and said arm, and having an outer toothed portion on an outer periphery thereof and a cam-contour surface on an inner periphery thereof, and being slidably guided by said side walls of said recessed toothed-block guide, a rotary cam having a cam-profile surface that is in cam-connection with said cam-contour surface of said toothed block, for producing outward and inward sliding motions of said toothed block to mesh and unmesh said outer toothed portion with and from said inner toothed portion by a rotary motion of said cam, an operating lever mechanically linked to said cam for producing said rotary motion of said cam, and auxiliary interlock means interposed between said arm and said toothed block and having a toothed portion that is meshable with said inner toothed portion of said arm, wherein said auxiliary interlock means is responsive to a deformation of said toothed block resulting from an impact force applied to said arm, for interlocking the rotary-cam type reclining device by meshed-engagement between said toothed portion of said auxiliary interlocking means and said inner toothed portion of said arm.

According to another aspect of the invention, a rotary-cam type reclining device comprises a base fixedly connected to a seat cushion, and defining therein a recessed toothed-block guide, said recessed toothed-block guide having a pair of parallel side walls, an arm fixedly connected to a seat back and rotatable supported on said base through a pivot shaft said arm having an inner toothed portion, a pair of toothed blocks slidably disposed between said base and said arm and diametrically opposing with respect to an axis of said pivot shaft, each of said toothed blocks having an outer toothed portion on an outer periphery thereof and a cam-contour surface on an inner periphery thereof and being slidably guided by said side walls of said recessed toothed-block guide so that both side walls of each of said toothed blocks face the associated side walls of said recessed toothed-block guide, a rotary cam having a pair of diametrically-opposing cam-profile surfaces that is in cam-connection with the associated cam-contour surfaces of said toothed blocks, for producing outward and inward sliding motions of said toothed blocks to mesh and unmesh said outer toothed portions with and from said inner toothed portions by a rotary motion of the cam, an operating lever mechanically linked to the can for producing the rotary motion of the cam, and a pair of interlocking members interposed between the inner toothed portion of the arm and the associated side walls of the toothed blocks, and diametrically opposing with respect to the axis of the pivot shaft, and having a toothed portion being meshable with the inner toothed portion of the arm, wherein each of the interlocking members is pivotally supported on the base near the associated side wall of a first toothed block of the toothed blocks, and has an innermost end face facing the associated side wall of a second toothed block of the toothed blocks, wherein each of the auxiliary interlocking members operates between a stand-by position where the innermost end face lies flush with the associated side wall of the toothed block and an emergency-interlock position where the toothed portions of the auxiliary interlocking members are fully meshed with the inner toothed portion of the arm in response to a deformation of the toothed blocks resulting from an impact force applied to the arm, for interlocking the rotary-cam type reclining device via a pivotal motion of each of the interlocking members. It is preferable that the interlocking members be point-symmetrical with each other with respect to the axis of the pivot shaft.

DESCRIPTION OF THE PREFERRED EMBODIMENTS

Figure 1:
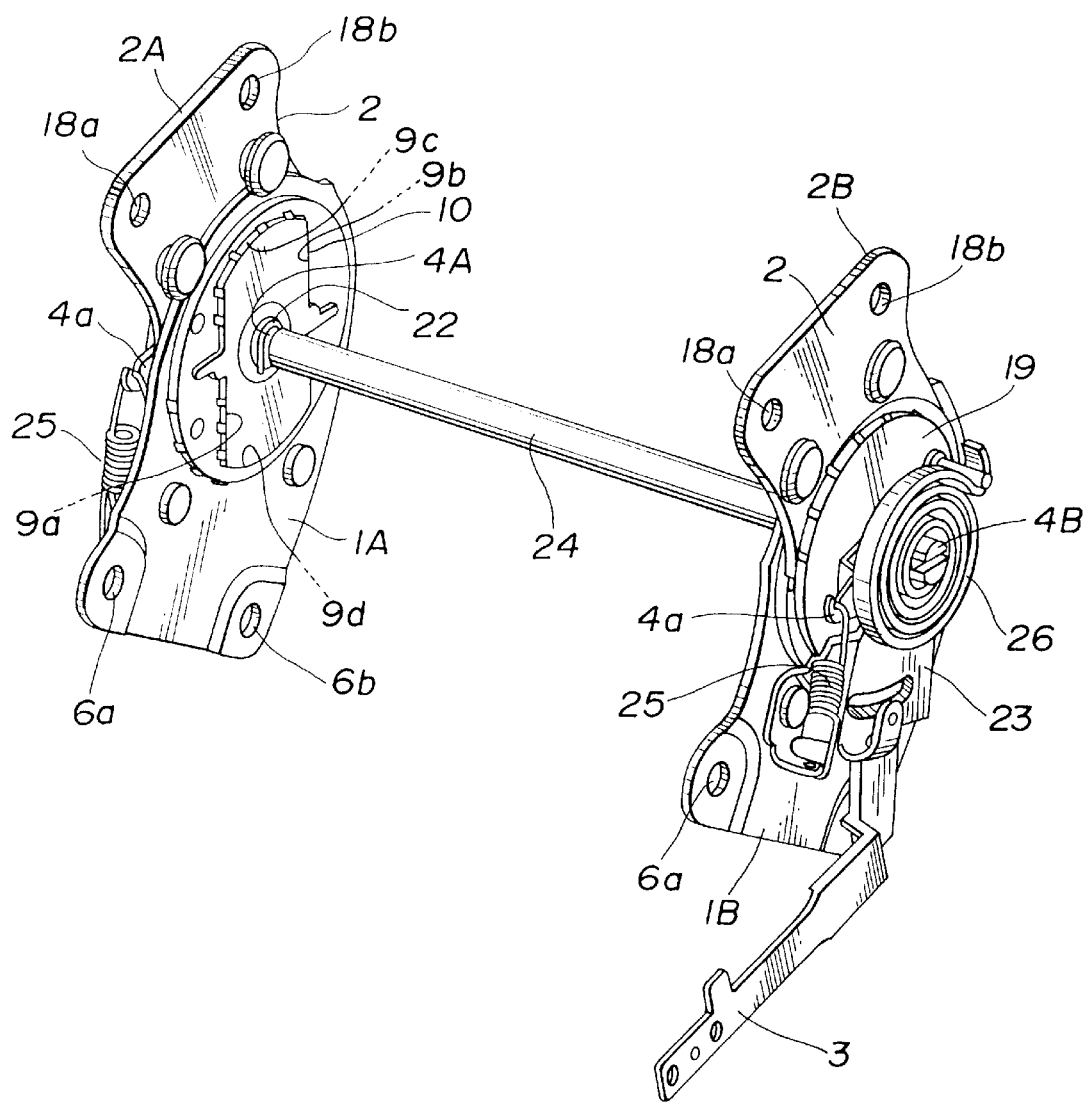
FIG. 1 is an assembled view illustrating one embodiment of a rotary-cam type reclining device made according to the invention.
Figure 2:
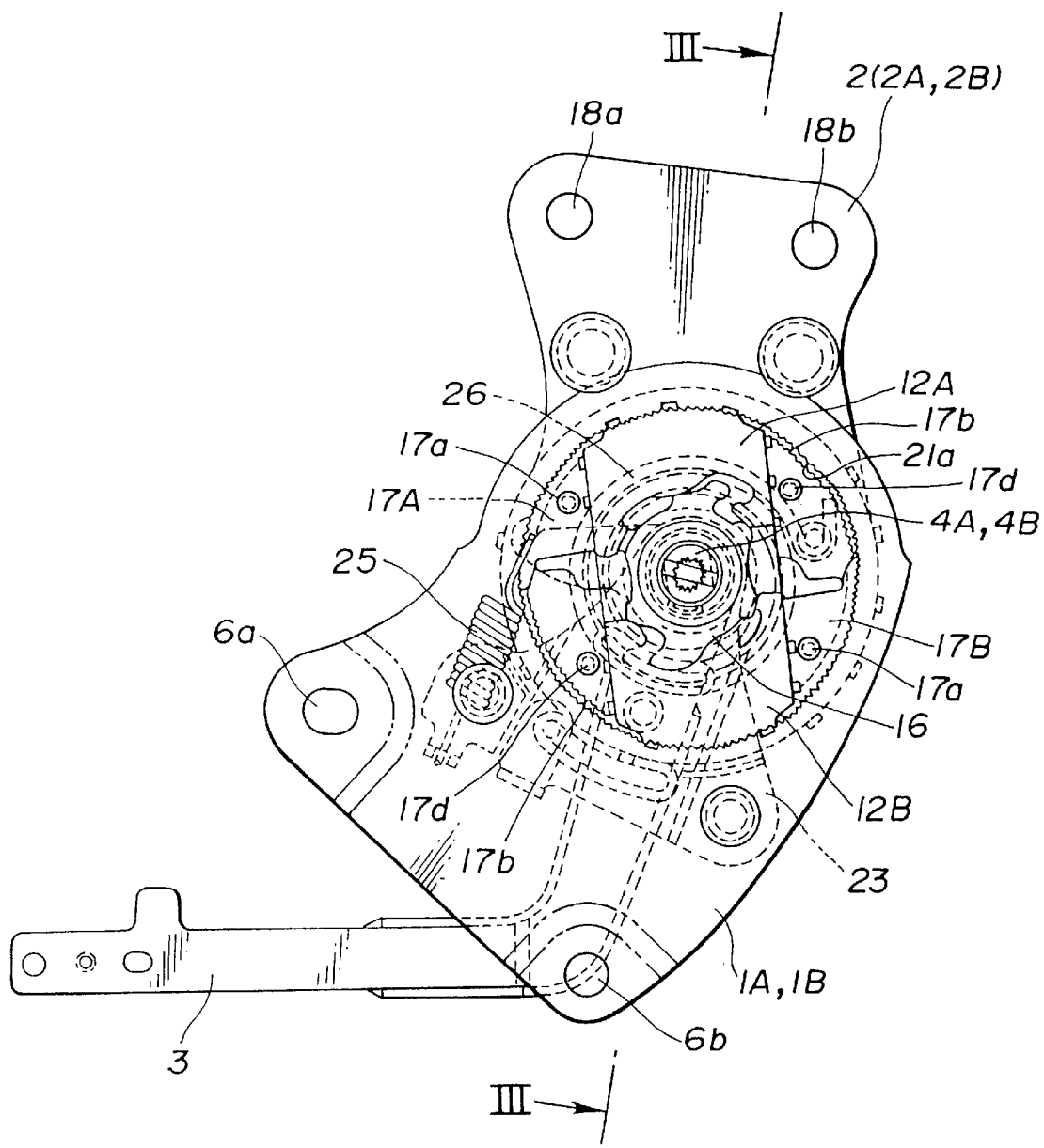
FIG. 2 is a side view illustrating the reclining device of the embodiment.
Figure 3:
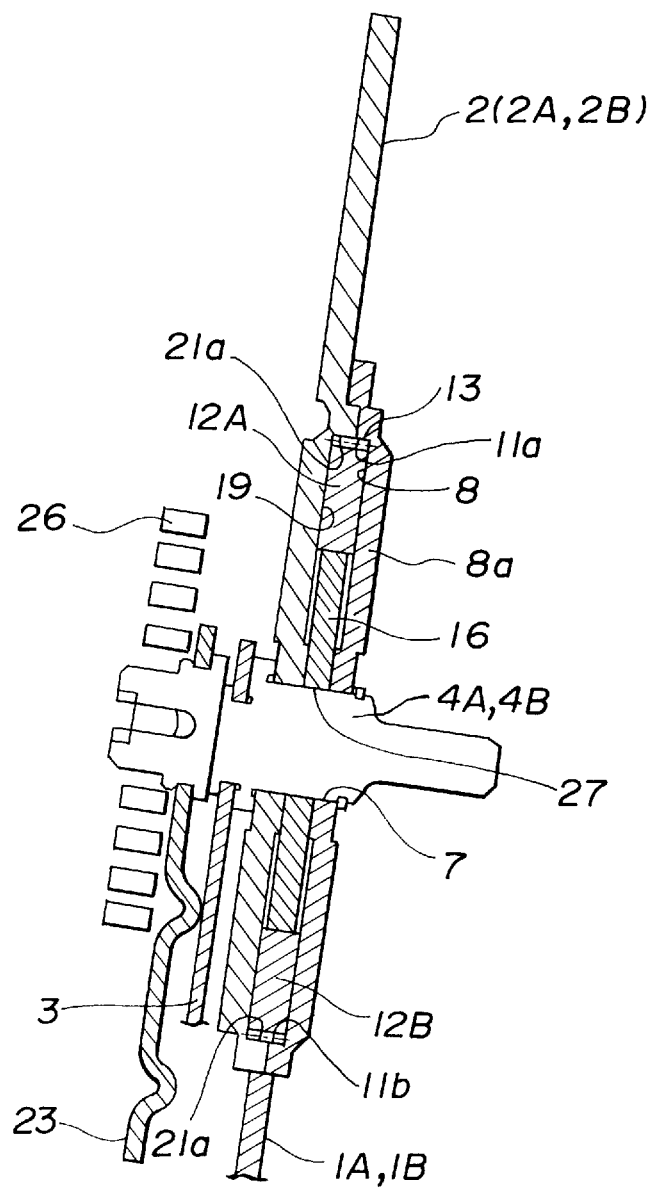
FIG. 3 is a cross-sectional view taken along the line III—III of FIG. 2.
Figure 4:
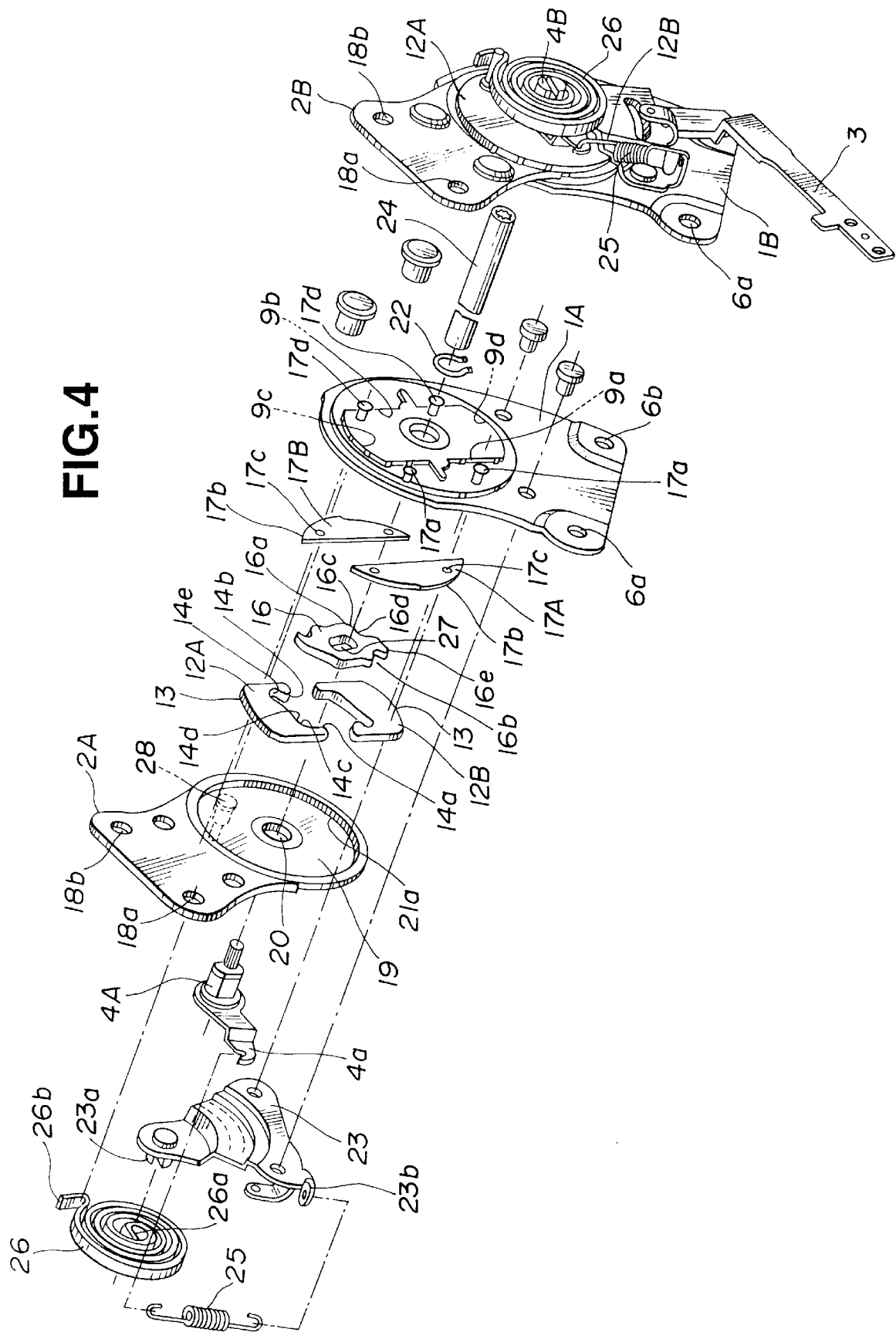
FIG. 4 is a dis-assembled view illustrating of the reclining device of embodiment.
Figure 5A:
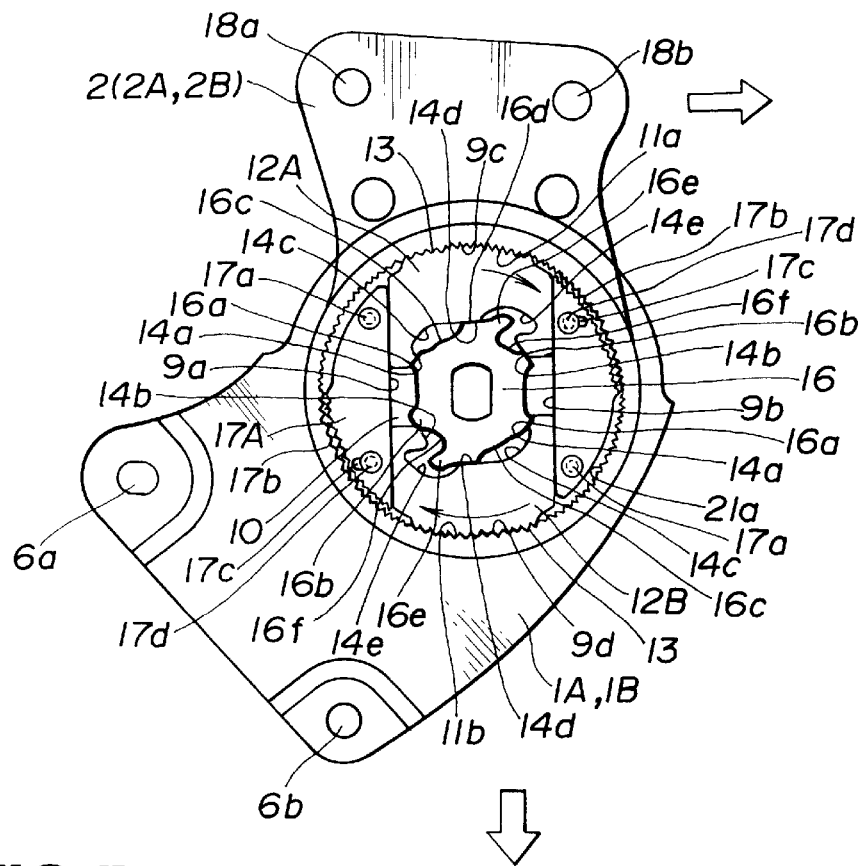
FIG. 5A is an explanatory view illustrating a usual locked state of the reclining device of the embodiment.
Figure 5B:
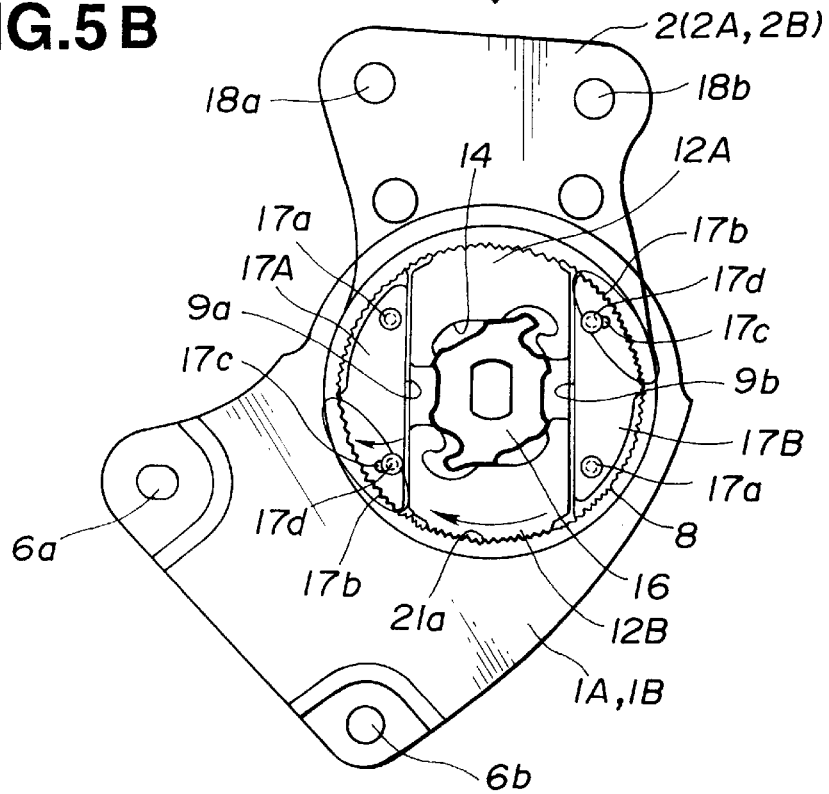
FIG. 5B is an explanatory view illustrating an unusual locked state of the reclining device of the embodiment with the arm heavily loaded.

Referring now to the drawings, particularly to FIGS. 1 to 4, the rotary-cam type reclining device of the invention is exemplified in case of a double-sided seat reclining apparatus. In FIG. 1, the right-hand side reclining device with a reclining-lever handle (simply reclining lever) 3 corresponds to an outside reclining device attached to the outside of a seat cushion (not shown) by means of a base 1B, the left-hand side reclining device corresponds to an inside reclining device attached to the inside of the seat cushion by means of a base 1A. The outside reclining device has an outside rotatable arm 2B fixedly connected to the outside of a seat back (not shown) and rotatably mounted on an outside pivot shaft 4B to which the reclining lever 3 is fixedly connected, whereas the inside reclining device has an inside rotatable arm 2A fixedly connected to the inside of the seat back and rotatably supported on an inside pivot shaft 4A. The two pivot shafts 4A and 4B are fixedly connected to each other through a connecting pipe 24 by way of serration or spline. As best seen in FIG. 4, the inside and outside bases 1A and 1B are symmetrical with each other in shape. As seen in. FIG. 1, each of the bases 1A and 1B is formed with a plurality of mounting-bolt holes 6a and 6b for firmly securing the base to the seat-cushion frame by way of bolts or the like. Each of the bases 1A and 1B is formed with a circular recessed portion 8 (see FIG. 3) having a central bore 7 into which the associated pivot shaft (4A; 4B) is rotatably fitted. As seen in FIGS. 1 and 3, a substantially rectangular recessed toothed-block guide 10 is formed essentially midway of the flat bottom plate section 8a of the base. The recessed toothed-block guide 10 has a pair of diametrically-opposing elongated side walls 9a and 9b) an upper circular-arc shaped side wall 9c being continuous with upper ends of the side walls 9a and 9b, and a lower circular-arc shaped side wall 9d being continuous with lower ends of the side walls 9a and 9b. As seen in FIG. 3, the upper circular-arc shaped side wall 9c is formed with an inner toothed portion 11a meshable with the outer toothed portion 13 of the upper toothed block 12A, whereas the lower circular-arc shaped side wall 9d is formed with an inner toothed portion 11b meshable with the outer toothed portion 13 of the lower toothed block 12B. The upper and lower toothed blocks 12A and 12B are guided within the recessed toothed-block guide 10 radially slidably by way of the guide side-walls 9a and 9b cooperating with each other. In addition to the outer toothed portion 13, each of the toothed blocks 12A and 12B has a cam-contour surface generally denoted by 14. The cam-contour surface 14 is composed of a plurality of complicated cam-contour surface portions 14a to 14e as fully described in later. A rotary cam 16 is fixedly connected to the associated pivot shaft for co-rotation together with the latter and interposed between the toothed blocks 12A and 12B. When the rotary cam 16 and the toothed block pair (12A; 12B) are assembled within the recessed toothed-block guide 10 of the base, the cam-contour surface of the upper toothed block 12A and the cam-contour surface of the lower toothed block 12B are point-symmetrical with respect to the axis of the pivot shaft 4 (or the axis of the central bore 7). As seen in FIG. 4, the pivot shaft 4 has a pair of diametrically-opposing circular-arc faces and a pair of rectangular flat faces. Each of the circular arc faces serves as a sliding surface which is slidably fitted to the inner peripheral surface of the central bore 20 of the arm 2. For co-rotation with the pivot shaft 4 of the reclining lever, the substantially rectangular bore 27 of the rotary cam 16 is contoured in such a manner as to be precisely fitted onto the pivot shaft without any play. After each of the inside and outside pivot shafts 4A and 4B, which are represented by the reference numeral 4 as generally referred to, is fitted into the associated bore 7 (see FIG. 3) of the base while supporting hereon both the arm 2 and the rotary cam 16, a snap ring 22 is fitted on the free end of the pivot shaft 4 to prevent the axial movement of the pivot shaft 4 with respect to the base. As seen in FIG. 5A, the cam-contour surface 14 of the toothed block (12A; 12B) is comprised of a substantially 45° up-sloped, raised edge portion 14a, a substantially 45° down-sloped, raised edge portion 14b, a first curved groove-cut portion 14c being continuous with the up-sloped raised edge portion 14a, a substantially straight, horizontally-extending intermediate portion 14d being continuous with the first curved groove-cut portion 14c, and a second curved groove-cut portion 14e being formed between the down-sloped raised edge portion 14b and the substantially straight, intermediate portion 14d. The rotary cam 16 is formed with a pair of diametrically-opposing cam-profile surfaces on its outer periphery such that the upper cam-profile surface of the rotary cam and the cam-contour surface of the upper toothed block 12A are in cam-connection, while the lower cam-profile surface of the rotary cam and the cam-contour surface of the lower toothed block 12B are in cam-connection. As seen in FIG. 5A, each cam-profile surface of the rotary cam 16 comprises a first sloped cam-edge portion 16a, a second sloped cam-edge portion 16b, an undulated cut-out portion 16c being continuous with the first sloped cam-edge portion 16a, a slightly-raised intermediate cam-edge portion 16d being continuous with the undulated cut-out portion 16c, a finger-tip like cam-edge portion 16e being continuous with the intermediate cam-edge portion 16d, and a curved groove-cut portion 16f formed between the second sloped cam-edge portion 16b and die finger-tip like cam-edge portion 16e. As clearly shown in FIGS. 2, 4, 5A and 5B, also provided are a pair of crescent-like auxiliary interlocking members 17A and 17B. The auxiliary interlocking members 17A and 17B function to hold a fully-locked state of the device even when impact force is accidentally applied to the arm of the reclining device, as will be more fully described later. As best seen in FIG. 5B, the left-hand side auxiliary interlocking member 17A is pivotally mounted on the flat bottom plate section 8a of the base in the vicinity of the upper end of the left-hand side wall of the upper toothed block 12A by means of a rivet or a headed pin 17a. The left-hand side auxiliary interlocking member 17A is formed with a lower-half, circular-arc shaped toothed portion 17b, which is meshable with the inner toothed portion 21a of the arm 2. The left-hand side auxiliary interlocking member 17A is formed with an arcuate guide slot 17c for pin-connection to a rivet or headed pin 17d firmly connected to the flat bottom plate section 8a usually by way of caulking. The guide slot 17c is provided to guide the angulation of the left-hand side crescent-like auxiliary interlocking member 17A about the rivet 17a serving as a pivot. That is, the rivet 17d serves as a journal pin for the auxiliary interlocking member 17A. As may be appreciated, there is a slight friction between the bearing surface of the rivet 17d and the guide slot 17c and/or between tile head of the rivet 17d and the upper face of the auxiliary interlocking member 17A, and thus, after angular adjustment of the arm to the base, the auxiliary interlocking member 17A is usually held at its initial position or stand-by position where the toothed portion 17b is slightly inwardly offset from a fully-meshed position between the toothed portion 17b and the inner toothed portion 21a of the arm and thus disengaged from the inner toothed portion 21a. Even if the auxiliary interlocking member 17A lies out of the initial position and the toothed portion 17b partly meshes with the inner toothed portion of the arm, the auxiliary interlocking member 17A may be pushed back to the initial position by the inner toothed portion 21a of the arm during rotation of the arm. Note that, with the auxiliary interlocking member 17A set at the initial position (or at the slightly inwardly offset position), the right-hand end face of the auxiliary interlocking member 17A lies flush with the side wall 9a of the recessed toothed-block guide 10, facing the two left-hand side walls of the upper and lower toothed blocks 12A and 12B. As seen in FIGS. 5A and 5B, the right-hand side crescent-like auxiliary interlocking member 17B is point-symmetrical with the left-hand side crescent-like auxiliary interlocking member 17A with respect to the axis of the pivot shaft 4 or the bore 7, and a geometry of the left-hand side auxiliary interlocking member 17A is identical to that of the right-hand side auxiliary interlocking member 17B. The reference signs used for the left-hand side auxiliary interlocking member 17A will be applied to the corresponding elements of the right-hand side auxiliary interlocking member 17B. Returning to FIG. 4, the arm 2 (2A; 2B) is formed with a plurality of mounting-bolt holes 18a and 18b, for firmly securing the arm to the seat back (not shown). The arm 2 is formed integral with a ring-gear like portion 19 having diametrically-opposing circular-arc shaped inner toothed portions (21a; 21a), which are point-symmetrical with respect to the axis of the pivot shaft 4. When assembling, the toothed blocks 12A and 12B are radially slidably accommodated in an internal space defined between the ring-gear like portion 19 of the arm 2 and the recessed toothed-block guide 10 of the base, so that the outer toothed portion 13 of each toothed block (12A; 12B) is meshable with the associated inner toothed portion 21a of the arm 2 and also the toothed portion 17b of each of the auxiliary interlocking members 17A and 17B is meshable with the associated inner toothed portion 21a of the arm, and so that the rotary cam 16 is rotatably accommodated between the toothed blocks 12A and 12B. The ring-gear like portion 19 is so designed to have an inner diameter identical to an inner diameter of the diametrically-opposing curved side walls 9c and 9d. The inside pivot shaft assembly 4A is formed with an armed portion 4a. On the other hand, the outside pivot shaft assembly 4B is formed with an armed portion 4a as well as the reclining lever 3 integrally connected to the pivot shaft 4B, as shown in FIG. 1. As seen in FIG. 4, the armed portion 4a has a spring slot at which one hooked end of a return spring 25 such as a coiled tension spring is hanged. The other hooked end of the return spring 25 is hanged at a bracket 23b of a holder 23, fixedly connected to the associated base, usually by means of rivets. Therefore, the operating lever or the pivot shaft 4 is biased to its initial position or a spring-loaded position by way of the bias of the spring 25. The holder 23 is formed integral with a slotted shaft 23a. The slotted portion of the slotted shaft 23a is engaged with the innermost central end 26a of a return spring 26 such as a spiral spring. The outermost curled end 26b of the return spring 26 is engaged with a pin 28 fixedly connected to the arm. With the previously-noted arrangement, the seat back, fixedly connected to the arm, is permanently forced to tilt forwards by means of the bias of the spring 26 under the unlocked condition of the device. The rotary-cam type reclining device of the embodiment operates as follows.

Returning to FIG. 1, the reclining lever 3 (i.e., the inside and outside pivot shaft assemblies 4A and 4B in rigid-connection by way of the connecting pipe 24) is normally biased to its initial position in the counter-clockwise direction (viewing FIG. 1) by way of the bias of the springs 25, and engaged with the holder 23 so that the maximum counter-clockwise rotational movement of the lever is restricted by way of the holder 23. Under such a released condition of the lever, as best seen in FIG. 5A, the first sloped cam-edge portion 16a, the second sloped cam-edge portion 16b and the slightly-raised intermediate cam-edge portion 16d of the cam-profile surface of the rotary cam 16 are respectively engaged with and in cam-contact with the up-sloped raised edge portion 14a, the down-sloped raised edge portion 14b and the substantially-straight intermediate portion 14d of the cam-contour surface of each of the upper and lower toothed blocks 12A and 12B, by way of the anti-clockwise rotation of the pivot shafts 4A and 4B. Owing to the counter-clockwise rotation of the pilot shafts, the upper and lower toothed blocks 12A and 12B move radially outwardly, while being guided by the two parallel side walls 9a and 9b within the recessed toothed-block guide 10. Thus, the outer toothed portions 13 of the toothed block pair (12A; 12B) are brought into meshed-engagement with the respective inner toothed portions (21a; 21a) of the arm 2 (2A; 2B) and also with the respective inner toothed portions 11a and 11b of the base 1 (1A; 1B). With the reclining lever 3 and the pivot shafts 4A and 4B held at their initial positions, the reclining device is held in its fully-locked state in which the relative rotational motion of the arm to the base is prevented by meshed-engagement between the toothed-block pair (12A; 12B) and the arm 2. Under the previously-noted completely-locked state of the reclining device, the two parallel side walls of each of the toothed blocks 12A and 12B are fitted to the respective side walls 9a and 9b of the recessed toothed-block guide 10 in addition to the meshed-engagement between the outer toothed portions (13; 13) and the inner toothed portions (21a; 21a) of the arm and the meshed-engagement between the outer toothed portions (13; 13) and the inner toothed portions (11a; 11b) of the base. In contrast with the above, for the purpose of shifting from the completely-locked state to the unlocked state, if the reclining lever 3 is pulled up and rotated in its clockwise direction against the spring bias, the rotary cam 16 rotates clockwise. The clockwise rotation of the rotary cam 16 causes the first sloped cam-edge portion 16a, the second sloped cam-edge portion 16b and the slightly-raised intermediate cam-edge portion 16d of the cam-profile surface of the rotary cam 16 to be dis-engaged from the up-sloped raised edge portion 14a, the down-sloped raised edge portion 14b and the substantially-straight intermediate portion 14d of the cam-contour surface of each of the toothed blocks 12A and 12B. Then, the arm 2 becomes rotated counterclockwise, because the arm is permanently forced to the counterclockwise direction by means of the bias of the return spring 26. In conjunction with the clockwise rotation of the rotary cam 16, such an anti-clockwise rotation of the arm 2 produces a radially inward sliding motion or a contracted motion of the toothed-block pair (12A, 12B). In this manner, the outer toothed portions 13 of the toothed-block pair are unmeshed from the inner toothed portions (21a; 21a) of the arm 2 and from the inner toothed portions 11a and 11b of the base 1 by way of the clockwise rotation of the lever. This unmeshed state corresponds to the unlocked state of the reclining device. Under these conditions, the seat back can be adjusted toward a desired angular position. When the lever 3 is returned to the spring-loaded position with the seat back adjusted at the desired angular position, the rotary cam 16 rotates counter-clockwise together with the lever. As a result, the toothed blocks 12A and 12B become slide radially outwardly, and thus the outer toothed portions (13; 13) of the toothed blocks 12A and 12B are brought again into meshed-engagement with the inner toothed portions (21a; 21a) of the arm and with the inner toothed portions 11a and 11b of the base. In this manner, the angular adjustment of the seat back can be attained.

Under certain vehicle occupant seating conditions, the seat back must reliably support the upper half of the body of the driver or occupant. Thus, during driving, the arm 2 of the reclining device is constantly loaded by the entire weight of the upper half of the body seated on the reclining seat. However, the magnitude of force acting on the seat back under such a usually-loaded condition of the seat back, is comparatively small, in comparison with a load or impact force created in case of accidental collision such as a front-end or rear-end crash of the car. FIG. 5A shows a usually-loaded state of the device, whereas FIG. 5B shows an abnormally heavily-loaded state of the device. Under the usually-loaded condition as shown in FIG. 5A, a force applied to the arm, is transmitted through the two meshed-engagement pairs (13, 21a; 13, 21a) to the toothed blocks 12A and 12B. The transmitted force can be received by a plurality of faces, namely the two opposing side walls 9a and 9b of the recessed toothed-block guide 10 and the upper and lower circular-arc shaped side walls 9c and 9d respectively with the inner toothed portions 11a and 11b. Under the usually-loaded condition, a bearing pressure or bearing stress on each of the side walls 9a, 9b, 9c and 9d is kept within a permissible level and thus there is no deformation of the side walls, thereby insuring a reclining function. As seen in FIG. 5A, when the arm is normally loaded, the toothed portions 17b of the diametrically-opposing two auxiliary interlocking members 17A and 17B are slightly inwardly spaced apart from the inner toothed portion 21a of the arm without putting any restriction on a rotational movement of the arm. In contrast to the above, in the event that an excessively large impact force is applied to the arm for example owing to a severe collision and thus the arm is abruptly and heavily loaded, such an excessively heavy load cannot be received by the side walls 9a and 9b and the toothed portions 11a and 11b of the side walls 9c and 9d of the base. In case of application of extremely heavy load, as shown in FIG. 5B, the side walls 9a and 9b of the recessed toothed-block guide 10 begin to deform. Supposing that the impact force acts on the arm in such a manner that the arm is abruptly, heavily loaded in the clockwise direction as shown by the arrow of FIG. 5B under the fully-locked condition of the reclining device, particularly the left-lower end and the right-upper end of the lower toothed block 12B and the left-lower end and the right-upper end of the upper toothed block 12A strongly push the associated side walls 9a and 9b of the recessed toothed-block guide 10 of the base and thus begin to push the two opposing innermost end faces of the crescent-like auxiliary interlocking members 17A and 17B with the side walls 9a and 9b slightly deformed. As a result of this, the left-hand side crescent-like auxiliary interlocking member 17A rotates clockwise about its pivot 17a, while the right-hand side crescent-like auxiliary interlocking member 17B rotates clockwise about its pivot 17a. That is to say, the two auxiliary interlocking members 17A and 173 serves as an emergency-interlock means for example under application of impact force to the seat back. The clockwise rotation of the respective auxiliary interlocking members 17A and 17B causes full meshed-engagement between the toothed portion 17b of each auxiliary interlocking member and the inner toothed portion 21a of the arm 2 (2A; 2B). The auxiliary interlocking members 17A and 17B function to prevent undesired accidental rotational motion of the arm, subjected to the impact load. This enhances a safety of the reclining device. Supposing that an excessively large impact force is applied to the arm under the fully-locked condition of the device in such a manner as to move the seat-back forwards, the toothed blocks 12A and 12B may be heavily loaded in the counter clockwise direction opposing the direction shown by the arrow in FIG. 5B. Even in the event that the arm is heavily loaded counter clockwise, the two opposing interlocking members 17A and 17B can mesh with the inner toothed portion 21a of the arm 2 (2A; 2B), since the distance between the pivot 17a of the left-hand hand side interlocking member 17A and a point of application of force transmitted from the lower toothed block 12B to the auxiliary interlocking member 17A is greater than the distance between the pivot 17a of the auxiliary interlocking member 17A and a point of application of force transmitted from the upper toothed block 12A to the auxiliary interlocking member 17A, and similarly the distance between the pivot 17a of the right-hand side interlocking member 17B and a point of application of force transmitted from the upper toothed block 12A to the auxiliary interlocking member 17B is greater than the distance between the pivot 17a of the auxiliary interlocking member 17B and a point of application of force transmitted from the lower toothed block 12B to the auxiliary interlocking member 17B. As appreciated from the above, the auxiliary interlocking members 17A and 17B contribute to enhancement of mechanical strength of the device particularly in case of application of excessive impact force. In other words, the auxiliary interlocking members 17A and 17B enhances the total mechanical strength of the device. Furthermore, the previously-described point-symmetrical arrangement of the rotary cam 16, the toothed-block pair (12A; 12B) and the diametrically-opposing two auxiliary interlocking members 17A and 17B with respect to the axis of the pivot shaft 4 (4A; 4B) contribute to a proper distribution of forces acting on the cam, the toothed-block pair, the side walls of the recessed toothed-block guide, and/or the innermost end faces of the auxiliary interlocking members 17A and 17B. The previously-noted diametrically-opposing auxiliary interlocking members 17A and 17B cooperate with each other to ensure a higher mechanical strength of the reclining device irrespective of the use of the toothed-block-guide side wall having a height identical to a toothed block guide employed in the prior art rotary-cam reclining device. As discussed above, the improved reclining device of the embodiment is superior to the prior art reclining device from the viewpoint of a mechanical strength (particularly an impact strength), and thus it is possible to reduce a thickness of each of the side walls (9a; 9b) of the recessed toothed-block guide 10 to a minimum permissible value and consequently to thin a thickness of the respective base (1A; 1B) while insuring a required safety level of the device. This may reduce total production costs of the device. Also, such a reduction in the thickness of the base (1A; 1B) may facilitate a machinability of the base or improve a formability of the base.

Although the reclining device of the embodiment has been discussed in case of a rotary-cam type reclining device employing a pair of diametrically-opposing two toothed blocks (12A; 12B) in cam-connection with a rotary cam the structure of the auxiliary interlocking members, made according to the invention, may be applied to a rotary-cam type reclining device with three or more toothed blocks provided between a rotary cam and an inner toothed portion of an arm, as disclosed in Japanese Patent Provisional Publication No. 6-125821 (corresponding to French Patent Application No. 91 02590 filed on Mar. 5, 1991).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A rotary-cam type reclining device comprising:

a base adapted to be fixedly connected to a seat cushion, and defining therein a recessed toothed-block guide, said recessed toothed-block guide having a pair of parallel side walls;

an arm adapted to be fixedly connected to a seat back and rotatably supported to said base, said arm having an inner toothed portion;

a toothed block slidably disposed between said base and said arm, and having an outer toothed portion on an outer periphery thereof and a cam-contour surface on an inner periphery thereof, and being slidably guided by said side walls of said recessed toothed-block guide;

a rotary cam having a cam-profile surface that is in cam-connection with said cam-contour surface of said toothed block, for producing outward and inward sliding motions of said toothed block to mesh and unmesh said outer toothed portion with and from said inner toothed portion by a rotary motion of said cam;

an operating lever mechanically linked to said cam for producing the rotary motion of said cam; and an auxiliary interlocking means interposed between said arm and said toothed block and having a toothed portion that is meshable with said inner toothed portion of said arm, wherein said toothed portion of said auxiliary interlocking means is brought into meshed-engagement with said inner toothed portion of said arm through a pushing action of said toothed block against said auxiliary interlocking means, in response to a deformation of said toothed block resulting from a heavy load applied to said arm, for interlocking the rotary-cam type reclining device by meshed-engagement between said toothed portion of said auxiliary interlocking means and said inner toothed portion of said arm.

2. A rotary-cam type reclining device comprising:

a base adapted to be fixedly connected to a seat cushion, and defining therein a recessed toothed-block guide, said recessed toothed-block guide having a pair of parallel side walls;

an arm adapted to be fixedly connected to a seat back and rotatably supported on said base through a pivot shaft, said arm having an inner toothed portion;

a pair of toothed blocks slidably disposed between said base and said arm and diametrically opposing with respect to an axis of said pivot shaft, each of said toothed blocks having an outer toothed portion on an outer periphery thereof and a cam-contour surface on an inner periphery thereof, and being slidably guided by said side walls of said recessed toothed-block guide so that both side walls of each of said toothed blocks face the associated side walls of said recessed toothed-block guide;

a rotary cam having a pair of diametrically-opposing cam-profile surfaces that are in cam-connection with the associated cam-contour surfaces of said toothed blocks, for producing outward and inward sliding motions of said toothed blocks to mesh and unmesh said outer toothed portions with and from said inner toothed portions by a rotary motion of said cam;

an operating lever mechanically linked to said cam (16) for producing the rotary motion of said cam; and a pair of auxiliary interlocking members interposed between said inner toothed portion of said arm and the associated side walls of said toothed blocks, and diametrically opposing with respect to the axis of said pivot shaft, and having a toothed portion that is meshable with said inner toothed portion of said arm, wherein said each of said auxiliary interlocking members is pivotally supported on said base near the associated side wall of a first toothed block of said toothed blocks, and has an innermost end face facing the associated side wall of a second toothed block of said toothed blocks, and wherein each of said auxiliary interlocking members operates between a stand-by position where said innermost end face lies flush with the associated side wall of said toothed block and an emergency-interlock position where said toothed portions of said auxiliary interlocking members are fully meshed with said inner toothed portion of said arm in response to a deformation of said toothed blocks resulting from an impact force applied to said arm, for interlocking the rotary-cam type reclining device via a pivotal motion of each of said auxiliary interlocking members.

3. The rotary-cam type reclining device as claimed in claim 2, wherein said interlocking members are point-symmetrical with each other with respect to the axis of said pivot shaft.

4. A rotary-cam type reclining device comprising:

a base adapted to be fixedly connected to a seat cushion, and defining therein a recessed toothed-block guide, the recessed toothed-block guide having a pair of parallel side walls;

an arm adapted to be fixedly connected to a seat back and rotatably supported on the base, the arm having an inner toothed portion;

a toothed block slidably disposed between the base and the arm and having an outer toothed portion on an outer periphery thereof and a cam-contour surface on an inner periphery thereof, and being slidably guided by the side walls of the recessed toothed-block guide;

a rotary cam having a cam-profile surface that is in cam-connection with the cam-contour surface of the toothed block for producing outward and inward sliding motions of the toothed block to mesh and unmesh the outer toothed portion with and from the inner toothed portion by a rotary motion of the cam;

an operating lever mechanically linked to the cam for producing the rotary motion of the cam; and an auxiliary interlocking means interposed between the arm and the toothed block and having a toothed portion that is meshable with the inner toothed portion of the arm, wherein the auxiliary interlocking means operates between a stand-by position where the toothed portion of the auxiliary interlocking means is out of meshed engagement with the inner toothed portion of the arm, and an emergency interlocking position where the toothed portion of the auxiliary interlocking means is fully meshed with the inner toothed portion of the arm in response to a deformation of the toothed block resulting from an impact force applied to the arm for interlocking the rotary-cam type reclining device.

* * * * *